United States Patent
Sun et al.

(10) Patent No.: US 9,062,167 B2
(45) Date of Patent: Jun. 23, 2015

(54) GLASS ARTICLE AND METHOD OF FORMING THE SAME

(75) Inventors: Ligang Sun, Shenzhen (CN); Zhiyuan Fan, Shenzhen (CN); Xiaoman Li, Shenzhen (CN); Hongzhi Guo, Shenzhen (CN); Taoyong Deng, Shenzhen (CN); Mingzhu Chang, Shenzhen (CN); Jiaxin Zhang, Shenzhen (CN)

(73) Assignee: BYD COMPANY LIMITED (CN)

( * ) Notice: Subject to any disclaimer, the term of this patent is extended or adjusted under 35 U.S.C. 154(b) by 805 days.

(21) Appl. No.: 13/379,997

(22) PCT Filed: Jul. 10, 2010

(86) PCT No.: PCT/CN2010/075099
§ 371 (c)(1),
(2), (4) Date: Dec. 21, 2011

(87) PCT Pub. No.: WO2011/006429
PCT Pub. Date: Jan. 20, 2011

(65) Prior Publication Data
US 2012/0100345 A1    Apr. 26, 2012

(30) Foreign Application Priority Data
Jul. 14, 2009  (CN) .......................... 2009 1 0159138

(51) Int. Cl.
| | |
|---|---|
| *B32B 3/02* | (2006.01) |
| *B32B 23/02* | (2006.01) |
| *C08J 5/12* | (2006.01) |
| *B29C 45/14* | (2006.01) |
| *B32B 17/10* | (2006.01) |
| *C09J 5/00* | (2006.01) |
| *B29K 709/08* | (2006.01) |

(52) U.S. Cl.
CPC ............. *C08J 5/12* (2013.01); *Y10T 428/24488* (2015.01); *B29C 45/14311* (2013.01); *B29C 45/14434* (2013.01); *B29K 2709/08* (2013.01); *B32B 17/10018* (2013.01); *B32B 17/10293* (2013.01); *C09J 5/00* (2013.01); *C09J 2400/143* (2013.01); *C09J 2400/226* (2013.01)

(58) Field of Classification Search
CPC ............ B32B 3/00; B32B 3/02; B32B 17/06; B32B 17/064; B32B 17/10293
USPC .............. 428/157, 161, 192, 122, 81, 83, 426
See application file for complete search history.

(56) References Cited

U.S. PATENT DOCUMENTS

| | | |
|---|---|---|
| 4,963,413 A | 10/1990 | Amano |
| 5,725,956 A | 3/1998 | McCurdy et al. |
| 2005/0210568 A1 | 9/2005 | Sheldon |

FOREIGN PATENT DOCUMENTS

| | | | |
|---|---|---|---|
| JP | 61129321 A | * | 6/1986 |
| WO | WO 2011/006429 A1 | | 1/2011 |

OTHER PUBLICATIONS

Translated abstract of JP 61-129321, Otomi, Jun. 17, 1986.*
Patent Cooperation Treaty; PCT International Search Report, Issued in Connection with International Application No. PCT/CN2010/075099; Nov. 4, 2010; 5 pages; China.
Patent Cooperation Treaty; PCT Written Opinion of the International Searching Authority, Issued in Connection with International Application No. PCT/CN2010/075099; Nov. 4, 2010; 5 pages; China.
Chinese Patent Office; Search Report, Issued in Connection with Chinese Application No. 200910159138.5; Dec. 4, 2010; 4 pages; China.

* cited by examiner

*Primary Examiner* — Catherine A Simone
(74) *Attorney, Agent, or Firm* — Greenberg Traurig, LLP

(57) ABSTRACT

A glass article is provided. The glass article may comprise: a glass body with convex-concave and/or via hole structures formed on at least a part of periphery of the glass body; a plastic layer adhered to the periphery of the glass body with adhesive coated therebetween. The plastic layer may be adhered to the glass body via the convex-concave and/or via hole structures. A method of forming the glass article as described above is also provided.

7 Claims, No Drawings

GLASS ARTICLE AND METHOD OF FORMING THE SAME

CROSS-REFERENCE TO RELATED APPLICATION

This application is a §371 national stage patent application based on International Patent Application No. PCT/CN2010/075099, filed Jul. 10, 2010, entitled "GLASS ARTICLE AND METHOD OF FORMING THE SAME", which claims the priority and benefit of Chinese Patent Application No. 200910159138.5 filed with the State Intellectual Property Office, P. R. C. on Jul. 14, 2009, the entire content of both applications are incorporated herein by reference.

FIELD

The present disclosure relates to a glass article and a method of forming the same.

BACKGROUND

Glass articles made of the glass materials are widely used in architecture, daily life, medical treatments, chemistry, electronics, instruments, nuclear industries, etc., for their properties of precise size, low weight, color versatility, and aesthetic appearance. Generally, glass articles may comprise sheet glass and special glass, in which the special glass is widely used and has various performances.

However, glass materials may not be used in certain fields for their poor impact resistance, fragility and poor bonding properties. To overcome the disadvantages of the poor impact resistance and fragility of the glass materials, the bonding of glass articles with a plastic part has been tried in the art. Adhesive dispensing process may be one of the most commonly used methods of bonding a glass sheet and a plastic part in the art, which may comprise the steps of: a) forming a plastic part by injection molding; b) coating an adhesive on the plastic part where the glass sheet is to be bonded; and c) bonding the processed glass sheet to the plastic part coated with the adhesive. However, the method thereof has the disadvantages of complex processes, long manufacturing period, high cost, and low yield with poor adhesive force between the glass sheet and the plastic part so that the plastic layer may easy warp.

SUMMARY

In viewing thereof, the present disclosure is directed to solve at least one of the problems existing in the prior art. Accordingly, a glass article is needed to be provided with enhanced adhesive force between a glass body and a plastic layer which may not warp easily. Further, a method of forming the same may need to be provided accordingly.

According to an aspect of the present disclosure, a glass article may be provided, comprising: a glass body with a convex-concave and/or via hole structures formed on at least a part of periphery on the glass body; a plastic layer adhered to the periphery of the glass body with adhesive coated therebetween. The plastic layer may be adhered to the glass body via the convex-concave and/or via hole structures.

According to another aspect of the present disclosure, a method of forming a glass article as described hereinabove is provided. And the method may comprise the steps of providing a glass body; forming convex-concave and/or via hole structures on at least a part of periphery on the glass body; coating adhesive on the periphery of the glass body; and placing the glass body in a mold and injecting a plastic layer on the periphery of the glass body.

As described above, due to the microstructure formed on the periphery of the glass body, the adhesive force between the glass body and the plastic layer may be improved dramatically, so that the plastic layer may not warp easily from the glass body, and the dimension tolerance may be reduced so that a glass article with a more accurate dimension may be provided.

Additional aspects and advantages of the embodiments of present invention will be given in part in the following descriptions, become apparent in part from the following descriptions, or be learned from the practice of the embodiments present invention.

DETAILED DESCRIPTION OF THE EMBODIMENT

Reference will be made in detail to embodiments of the present disclosure. The embodiments described herein are explanatory, illustrative, and used to generally understand the present disclosure. The embodiments shall not be construed to limit the present disclosure. The same or similar elements and the elements having same or similar functions are denoted by like reference numerals throughout the descriptions.

According to an embodiment of the present invention, a glass article is provided, comprising a glass body with convex-concave and/or via hole structures formed on at least a part of periphery on the glass body, such as a part of the sides or edges of the glass body; and a plastic layer adhered to the periphery of the glass body with adhesive coated therebetween. The plastic layer may be adhered to the glass body via the convex-concave and/or via hole structures, which further enhances the adhesive force between the glass body and the plastic layer by the adhesive.

In the following, the edges formed on the glass body will be described. However, it should be noted that the description thereof is just for illustration purpose rather than for limitation. And the scope of the present disclosure will be defined by the appended claims. According to an embodiment of the present disclosure, the dimension ratios of the edges of the glass body to the glass body is about 0.005 to about 0.2, preferably about 0.01 to about 0.1. For example, the glass body may have a length of about 100 mm, a width of about 60 mm, and a thickness of about 10 mm, the edges thereof may have a length of about 1 mm to about 10 mm, and a width of about 0.6 mm to about 6 mm. According to an embodiment of the present disclosure, the annular area along the periphery of the glass body formed by a first predetermined width, such as 0.6-6 mm, in the width direction of the glass body and a second predetermined width, such as 1 mm to about 10 mm, in the length direction of the glass body may be deemed as an example for the edges of the glass body. However, it should be noted that the definition of the term "edge" here is just for illustration purpose rather for limitation. Any edge that may be used or implemented for adhering to a plastic layer may fall within the definition of the term "edge" in the present disclosure.

The convex-concave and/or via hole structures, on the one side, may enlarge the contact area between the plastic layer and the edges of the glass body, on the other side may provide more friction and resistance in various directions when the plastic layer warps or shrinks, thus effectively preventing warping or shrinkage of the plastic layer. There are no special limits on the number or size of the convex-concave or via hole structures. There may be a plurality of convex-concave or via hole structures at the edges of the glass body. For the convex-concave or via hole structures, any size that meet the requirements described above may be used. According to an embodiment of the present disclosure, the ratio of the depth of the convex-concave structures to the thickness of the glass body is about 0.1 to about 0.99, preferably about 0.4 to about 0.8. According to an embodiment of the present disclosure, the ratio of the width of each convex-concave structure to the thickness of the glass body may be about 0.5 to about 20, preferably about 1.5 to about 10. According to an embodiment of the present disclosure, the ratio of the opening size of each via hole to the thickness of the glass body may be about 1 to about 10. And when there are more via holes formed on the periphery of the glass body, the spacing between two adjacent via holes may be about 1 to about 10 times as large as the opening size of each via hole. If the above requirements are satisfied, the strength of the glass body and the adhesive strength or force between the glass body and the plastic layer may be ensured. The depth of each convex-concave structure may refer to a dimension in the thickness direction of the glass body, while the width of each convex-concave structure may refer to a dimension in the width direction of the glass body. The opening size of each via hole may refer to the largest distance from a side to another side opposite to the side of the opening of the via hole. For example, when the via hole is circular, the opening size of the via hole may refer to the diameter of the circular via hole.

There are no special limitations on the shape of the convex-concave structures, provided that at least one surface of each convex-concave structure is not parallel to a surface of the glass body where the convex-concave structures are formed. For example, the convex-concave structure may be a step structure, a groove structure, an anchoring structure, a saw-tooth structure, or combinations thereof. According to an embodiment of the present disclosure, the step structure may be implemented. The step structure may comprise about 1 to about 10 steps, preferably about 2 to about 5 steps. Preferably, the step structure has the lowest step at the edges of the glass body, and the steps becomes higher and higher from the edges to the center of the glass body. In this way, the difficulty in processing the glass body may be reduced. Meanwhile, the warping of the plastic layer from the glass body may be effectively prevented.

The via holes may have various shapes, such as circular, rectangular, square, or triangular shapes. The via hole may be vertical or not vertical to the surface of the glass body, preferably not vertical to the surface of the glass body, to effectively prevent the plastic layer from warping. The via hole may also have a size of the center which is larger than the open size of both ends, to further reduce the possibility of warping.

Both the convex-concave structures and the via hole structures may be formed or patterned by those methods commonly adopted in the art.

According to an embodiment of the present disclosure, the plastic layer may be made of any plastic commonly used in the art. Generally, the plastics may be thermoplastics selected from the group consisting of polyethylene, polypropylene, polyvinyl chloride, polystyrene, poly(meth)acrylate, nylon, polycarbonate, polyurethane, polytetrafluoroethylene, poly(ethylene terephthalate), and combinations thereof. Preferably, the plastics may be transparent plastics with low shrinkage, such as polycarbonate and/or poly(meth)acrylate.

There are no special limitations on the adhesive. The adhesive may be any conventional adhesive that bond a glass body and a plastic layer, such as ultraviolet curable adhesive, quick-drying adhesive or hot melt adhesive, which are commonly used in the art. For example, the adhesives may be commercially available from Ellsworth Adhesives Asia (Shanghai), Henkel Adhesive Co., Ltd., or Guangzhou Lushan New Materials Co., Ltd, P.R.C. There are no special limitations on the amount of the adhesive, provided that the adhering positions between the glass body and the plastic layer are all coated with the adhesive. Generally, the amount of the adhesive applied may be about 80 $g/m^2$ to about 200 $g/m^2$. Too much amount of adhesive may cause an uneven surface of the glass body due to the overflow of the adhesive whereas too small amount of adhesive may not meet the requirement for adhesion, thus further negatively affecting the quality of final products.

There are no special limitations on the thickness of the plastic layer. Generally, the plastic layer may have a thickness of about 0.8 mm to about 5 mm, preferably about 0.8 mm to about 2 mm. There will be an increased tendency of warping when the plastic layer has a thickness larger than about 2 mm.

According to an embodiment of the present disclosure, the glass body may be formed as shells and displays of various kinds of electronic products.

According to an embodiment of the present disclosure, a method for forming a glass article as described above may be provided, which may comprise the steps of: providing a glass body; forming convex-concave and/or via hole structures on at least a part of periphery on the glass body; coating adhesive on the periphery of the glass body; and placing the glass body in a mold and forming or injecting a plastic layer on the periphery of the glass body.

There are no special limitations on the shape of the convex-concave structures, provided that at least one surface of each convex-concave structure is not parallel to a surface of the glass body where the convex-concave structures are formed. For example, the convex-concave structure may be a step structure, a groove structure, an anchoring structure, a saw-tooth structure, or combinations thereof. According to an embodiment of the present disclosure, the step structure may be implemented.

The via holes may have various shapes, such as circular, rectangular, square, or triangular shapes. The via hole may be vertical or not vertical to the surface of the glass body, preferably not vertical to the surface of the glass body, to effectively prevent the plastic layer from warping. The via hole may also have a size of the center which is larger than the open size from both ends, to further reduce the possibility of warping.

There are no special limitations on the size of the convex-concave structures or via holes, and all sizes that meet the requirements described above may be applied. Preferably, the ratio of the depth of the convex-concave structures to the thickness of the glass body may be about 0.1 to about 0.99, more preferably, about 0.3 to about 0.8. The ratio of the width of the convex-concave structures to the thickness of the glass body is preferably about 0.5 to about 20, more preferably about 1.5 to about 10. The ratio of the opening size of the via hole to the thickness of the glass body is preferably about 1 to about 10. The spacing between two adjacent via holes may be about 1 to about 10 times as large as the opening size of each via hole. According to an embodiment of the present disclosure, the spacing between two adjacent via holes may be about 1 mm to about 50 mm.

The injecting may be those commonly used in the art. However, because of the fragile property of glass, the condition in the injection process may be different from that in the conventional injection process. The condition may comprise: a cylinder temperature of about 295° C. to about 310° C., a nozzle temperature of about 290° C. to about 305° C., a mold temperature of about 80° C. to about 100° C., a plasticizing pressure of about 15 Kg/cm² to about 25 Kg/cm², an injecting pressure of about 1200 Kg/cm² to about 1800 Kg/cm², an injecting time of about 0.2 s to about 1 s, and a cooling time of about 10 s to 15 s. In this way, the glass body may be well prevented from being fragile.

The cylinder temperature refers to the temperature of the cylinder in the injecting machine during injecting. The nozzle temperature refers to the temperature of the nozzle in the injector during injection molding, and generally the nozzle temperature is a little lower than the cylinder temperature. The cylinder and nozzle temperatures may mainly affect the flowing and plasticizing of the plastics, while the mold temperature may mainly affect the flowing and cooling of the plastics. The plasticizing pressure may also be called back pressure, and when a screw injecting machine is applied, the plasticizing pressure refers to the pressure under which melted plastics on top of the screw or the piston push the screw back. The injecting pressure is a pressure applied by the top of the screw or the piston on the plastics in order to overcome the flowing resistance of the plastics during flowing from the cylinder to the mold, to provide the melted plastics with sufficient speed, and to compact the melt plastics. The injecting time refers to the shortest time for which the screw or the piston finishes an entire stroke. The cooling time refers to the shortest solidifying time of the melted resin after injecting the melted resin in the mold.

According to an embodiment of the present disclosure, the mold may be manufactured according to the dimension of the products by any conventional method. According to an embodiment of the present disclosure, to further prevent the glass body from being damaged or broken during injection molding, the portions of the glass body not configured to be filled with the plastics may not be completely contacted with the mold. More preferably, the mold may be further contacted with the glass body at the area with a width of about 2 mm to about 4 mm inwardly from its edges.

According to an embodiment of the present disclosure, the method for forming a glass article as describe above may further comprise a step of cleaning the surface of the glass body and the convex-concave structures with a washing agent or solution, before coating an adhesive on the periphery, such as edges and sides of the glass body. The object of the cleaning step is to remove residues or dirts on the surface of the glass body and the convex-concave structures, thus preventing the residues or dirts from affecting the even thickness of the adhesive on the convex-concave structures and the adhesion between the glass body and the plastic layer. The washing solution may be any conventional vaporable one, such as clear water or alcohol. The alcohol is often used to remove the residues or dirts during the manufacturing process.

According to an embodiment of the present disclosure, the glass body may be processed to a desired shape before forming the convex-concave and/or via hole structures on the periphery thereof. The size and shape thereof should satisfy the requirements of the practical use. The manufacturing method may be known to those skilled in the art, such as that selected from the group consisting of cutting, profiling, chamfering, rough milling, polishing, strengthening and combinations thereof. The cutting may be performed by an automatic glass cutting machine to form the glass body in a precise shape, and to make a size of the glass body larger than the final products, which favors the remaining manufacturing steps. The profiling comprises the steps of: bonding the product on a bonding tool, and cutting the sides of the product with a high-speed rotating disc whose surface is coated with emery to make profiles of the product. The chamfering is achieved by a high-speed rotating cylindrical cutting tool, to form a chamfer at the edges of the glass body. The rough milling is used to manufacture the glass body with a certain thickness. The polishing is performed on the surface of a glass body, so that the thickness of the glass body is well controlled in a precise range. The strengthening process may improve the hardness of the glass body, thus further enhancing the quality of the final product.

According to embodiments of the present disclosure, the glass body may be manufactured to a precise size and shape to control the size and shape of the final product, so that the size tolerance of the final product may be significantly reduced.

Additional details of some embodiments of the present disclosure will be described in the following.

Embodiment 1

The present embodiment discloses a glass article and a method for forming the glass article.

a) Glass Manufacturing

A glass body was formed with a size of 10 cm×5 cm×3 mm by an automatic glass cutting machine BX400, commercially available from Srate Optical Instrument Manufactory, Nanyang, P.R.C. The formed glass body was rough milled and polished to achieve a thickness of about 2.5 mm. The polished glass body was curved to form some step structures having a width of about 3 mm, 3 steps with the same height, and a total depth of about 1.5 mm, at the edges of the glass body. The edges of the glass body are an annular area with a width of about 5 mm.

b) Cleaning and Coating with Adhesive

The surface of the glass body and the step structures at the edges of the glass body were cleaned with alcohol to remove any residue or dirt on the surface of the glass body and the step structures. 0.1 g of hot melt adhesive P26-5, available from Guangzhou Lushan New Materials Co., Ltd., P.R.C., was coated on the step structures and the sides of the glass body uniformly at a temperature of about 80° C.

c) Injecting

The glass body coated with the hot melt adhesive was placed into a mold with a width of about 2 mm, then polymethyl methacrylate was injected into the mold, under the conditions of: a cylinder temperature of about 300° C., a nozzle temperature of about 295° C., a mold temperature of about 80° C., a plasticizing pressure of about 20 Kg/cm², an injecting pressure of about 1600 Kg/cm², an injecting time of about 0.6 s, and a cooling time of about 15 s. The glass article was obtained with a plastic layer having a thickness of about 2 mm at the edges and sides of the glass body.

Embodiment 2

The present embodiment discloses a glass article and a method for forming the glass article.

a) Glass Manufacturing

A glass body was formed with a size of 10 cm×5 cm×3 mm by an automatic glass cutting machine BX400, commercially available from Srate Optical Instrument Manufactory, Nanyang, P.R.C. The formed glass body was rough milled and polished to achieve a thickness of about 2.5 mm. The polished glass body was curved to form some step structures having a width of about 4 mm, 2 steps with the same height, and a total depth of about 1 mm at the edges of the glass body. The edges of the glass body were an annular area with a width of about 5 mm.

b) Cleaning and Coating with Adhesive

The surface of the glass body and the step structures at the edges of the glass body were cleaned with alcohol to remove any residue or dirt on the surface of the glass body and the step structures. 0.12 g of hot melt adhesive P26-5, commercially available from Guangzhou Lushan New Materials Co., Ltd., P.R.C., was coated on the step structures and the sides of the glass body uniformly at a temperature of about 80° C.

c) Injecting

The glass body coated with the hot melt adhesive was placed into a mold with a width of about 2 mm, then polymethyl methacrylate was injected into the mold, under the conditions of: a cylinder temperature of about 295° C., a nozzle temperature of about 290° C., a mold temperature of about 90° C., a plasticizing pressure of about 15 Kg/cm², an injecting pressure of about 1200 Kg/cm², an injecting time of about 1.0 s, and a cooling time of about 12 s. The glass article was obtained with a plastic layer having a thickness of about 2 mm at the edges and sides of the glass body.

Embodiment 3

The present embodiment discloses a glass article and a method for forming the glass article.

a) Glass Manufacturing

A glass body was formed with a size of 10 cm×5 cm×3 mm by an automatic glass cutting machine BX400, commercially available from Srate Optical Instrument Manufactory, Nanyang, P.R.C. The formed glass body was rough milled and polished to achieve a thickness of about 2.5 mm. The polished glass body was curved to manufacture some via holes at the edges of the glass body, where the shortest space between the edges of the glass body and the via holes was about 1.5 mm. The via holes have a diameter of about 2 mm, and the space between two adjacent via holes was about 5 mm. The edges of the glass body were an annular area with a width of about 5 mm.

b) Cleaning and Coating with Adhesive

The surface of the glass body and the via holes at the edges of the glass body were cleaned with alcohol to remove any residue or dirt on the surface of the glass body and in the via holes. 0.2 g of quick-drying adhesive UK4501, commercially available from Henkel Adhesives Co., Ltd., was coated in the via holes and at an area with a width of about 5 mm inwardly from the edges of the glass body and on the sides of the glass body uniformly at a temperature of about 80° C.

c) Injecting

The glass body coated with the hot melt adhesive was placed into a mold with a width of about 2 mm, then polymethyl methacrylate was injected into the mold, under the conditions of: a cylinder temperature of about 310° C., a nozzle temperature of about 300° C., a mold temperature of about 100° C., a plasticizing pressure of about 25 Kg/cm², an injecting pressure of about 1800 Kg/cm², an injecting time of about 0.2 s, and a cooling time of about 10 s. The glass article was obtained with a plastic layer having a thickness of about 2 mm at the edges and sides of the glass body.

Comparative Embodiment 1

The present comparative embodiment discloses a glass article and a method for forming the glass article.

a) Glass Manufacturing

A glass body was formed with a size of 10 cm×5 cm×3 mm by an automatic glass cutting machine BX400, commercially available from Srate Optical Instrument Manufactory, Nanyang, P.R.C.

b) Cleaning and Coating with Adhesive

The surface of the glass body was cleaned with alcohol to remove any residue or dirt on the surface of the glass body. 1 g of quick-drying adhesive UK4501, commercially available from Henkel Adhesives Co., Ltd. was coated at a U-shape area with a width of about 3 mm.

c) Injecting

A polycarbonate membrane was attached to the glass body where the quick-drying adhesive are coated, thus the membrane was adhered to the sides and edges of the glass body. Thus, the glass article was formed with a plastic layer having a thickness of about 2 mm.

Warp Testing

The glass articles formed by embodiment 1, embodiment 2, embodiment 3 and the comparative embodiment 1 were cooled at room temperature, and placed for 30 days respectively. The glass articles were observed on the first, fifth, tenth, twentieth, and thirtieth days respectively. And the comparing results are shown in Table 1 in the following.

TABLE 1

| Warp | Time (day) | | | | |
| --- | --- | --- | --- | --- | --- |
| | 1st day | 5th day | 10th day | 20th day | 30th day |
| Embodiment 1 | X | X | X | X | √ |
| Embodiment 2 | X | X | X | X | √ |
| Embodiment 3 | X | X | X | X | X |
| Comparative Embodiment 1 | X | X | √ | √ | √ |

Note:
X: The plastic layer does not warp;
√: The plastic layer warps.

It may be concluded from the above that, due to the convex-concave and/or via hole structures formed on at least a part of the periphery of the glass body, the warping of the plastic layer from the glass body in the glass article may be effectively prevented.

Reference throughout this specification to "an embodiment" and "some embodiments" means that a particular feature, structure, material, or characteristic described in connection with the embodiment or example is included in at least one embodiment or example of the invention. Thus, the appearances of the phrases such as "According to an embodiment of the present disclosure" in various places throughout this specification are not necessarily referring to the same embodiment or example of the invention. Furthermore, the particular features, structures, materials, or characteristics may be combined in any suitable manner in one or more embodiments or examples.

Although explanatory embodiments have been shown and described, it would be appreciated by those skilled in the art that changes, alternatives, and modifications can be made in the embodiments without departing from spirit and principles of the invention. Such changes, alternatives, and modifications all fall into the scope of the claims and their equivalents.

What is claimed is:

1. A glass article comprising:
 a glass body with convex-concave structures formed on at least a part of periphery on the glass body; and
 a plastic layer adhered to the periphery of the glass body with adhesive coated therebetween, wherein
 the plastic layer is adhered to the glass body via the convex-concave structures, wherein the ratio of a depth of the convex-concave structure to a thickness of the glass body at the periphery is about 0.1 to about 0.99, and the ratio of a width of the convex-concave structure to a thickness of the glass body at the periphery is about 0.5 to about 20.

2. The glass article according to claim 1, wherein the ratio of the depth of the convex-concave structure to the thickness of the glass body at the periphery is about 0.3 to about 0.8, and the ratio of the width of the convex-concave structure to the thickness of the glass body at the periphery is about 1.5 to about 10.

3. The glass article according to claim 1, wherein the convex-concave structure is selected form the group consisting of step structures, groove structures, anchoring structures, sawtooth structures, and combinations thereof.

4. The glass article according to claim 1, further comprising via hole structures formed on at least part of periphery of the glass body, wherein: the diameter of the via holes is about 1 to about 10 times of the thickness of the glass body at the periphery, and the spacing between neighboring via hole structures is about 1 to about 10 times as large as the diameter of the via hole.

5. The glass article according to claim 1, wherein the periphery of the glass body includes edges and sides of the glass body.

6. The glass article according to claim 5, wherein the plastic layer has a thickness of about 0.8 mm to about 5 mm; the size ratio of the edges of the glass body to the glass body is about 0.005:1 to about 0.2:1, and the adhesive dosage on the edges of the glass body is about 80 g/m2 to about 200 g/m2.

7. The glass article according to claim 1, wherein the plastic layer is selected from the group consisting of polyethylene, polypropylene, polyvinyl chloride, polystyrene, poly(meth)acrylate, nylon, polycarbonate, polyurethane, polytetrafluoroethylene, poly(ethylene terephthalate), and combinations thereof, and the adhesive is UV (ultraviolet) curable adhesive, quick-drying adhesive or hot melt adhesive.

\* \* \* \* \*